United States Patent
Saputo et al.

[11] Patent Number: 6,164,314
[45] Date of Patent: Dec. 26, 2000

[54] OVERSIZED AIR VALVE FOR USE WITH INFLATABLE DEVICES AND METHOD

[75] Inventors: Richard A. Saputo, Tarzana, Calif.; Hua Hsiang Lin, Kowloon, The Hong Kong Special Administrative Region of the People's Republic of China

[73] Assignee: Intex Recreation Corp., Long Beach, Calif.

[21] Appl. No.: 09/482,392

[22] Filed: Jan. 12, 2000

[51] Int. Cl.$^7$ .................................................. F16K 15/20
[52] U.S. Cl. .......................... 137/232; 137/523; 446/224
[58] Field of Search .................................. 137/223, 844, 137/845, 847, 855, 232, 523; 446/224

[56] References Cited

U.S. PATENT DOCUMENTS

| | | | |
|---|---|---|---|
| 3,100,498 | 8/1963 | Gibson, Jr. | 137/223 |
| 3,401,714 | 9/1968 | Scott | 137/223 |
| 3,903,915 | 9/1975 | Rosaz | 137/232 |
| 3,905,387 | 9/1975 | Grant | 137/223 |
| 4,274,633 | 6/1981 | Benscher | 446/224 X |
| 4,320,776 | 3/1982 | Yang | 137/223 |
| 4,556,086 | 12/1985 | Raines | 137/852 |
| 4,768,537 | 9/1988 | Tash | 137/15 |
| 4,782,778 | 11/1988 | Barbaglia | 114/52 |
| 4,823,831 | 4/1989 | Jaw | 137/223 |
| 4,848,600 | 7/1989 | Dark | 222/498 |
| 5,033,498 | 7/1991 | Brandt | 137/223 |
| 5,083,581 | 1/1992 | Jaw | 137/223 |
| 5,119,842 | 6/1992 | Jaw | 137/232 |
| 5,343,889 | 9/1994 | Jaw | 137/232 |
| 5,351,711 | 10/1994 | Peter | 137/232 |
| 5,358,001 | 10/1994 | Smith | 137/223 |
| 5,868,158 | 2/1999 | Yuan | 137/316 |
| 5,915,407 | 6/1999 | West | 137/223 |

FOREIGN PATENT DOCUMENTS

| | | | |
|---|---|---|---|
| 126789 | 10/1945 | Australia | 137/223 |
| 97/17560 | 5/1997 | WIPO | 137/223 |

*Primary Examiner*—John Rivell
*Assistant Examiner*—Meredith H. Schoenfeld
*Attorney, Agent, or Firm*—Lewis, D'Amato, Brisbois & Bisgaard, LLP

[57] ABSTRACT

An oversized air valve for use with inflatable devices typically in an above-the-ground swimming pool or an inflatable mattress is disclosed. In its most fundamental embodiment, the oversized air valve for use with inflatable devices includes a construction having an outer housing and a base flange connected to the outer housing for being secured to an inflatable device. A cylindrical passageway is formed through the outer housing for carrying pressurized air. A cap attached to the cylindrical passageway enables the air valve to be sealed against air leakage. Finally, a removable rigid member is insertable into the cylindrical passageway for preventing deformation to the air valve. The removable rigid member is force-fitted into the cylindrical passageway and is of a length sufficient to displace a back pressure flap hinged to the bottom of the cylindrical passageway. When partially inserted into the cylindrical passageway, the rigid member prevents deformation of the oversized air valve when the valves are tightly packed together. However, when fully inserted into the cylindrical passageway, the rigid member enables exhausting of the pressurized air through a displaced back pressure flap and the rigid member. In an alternative embodiment, an air sealing cap and a deflation insert are each attached to the cylindrical passageway by separate flexible leads.

17 Claims, 7 Drawing Sheets

OVERSIZED AIR VALVE FOR USE WITH INFLATABLE DEVICES AND METHOD

BACKGROUND OF THE INVENTION

1. Field of the Invention

The present invention relates to air valves. More specifically, the present invention relates to methods and apparatus for an oversized air valve comprised of a flexible polymer for use in, for example, above-the-ground, inflatable type swimming pools and air mattresses, and which includes a removable, cylindrical-shaped rigid synthetic insert which prevents deformation of the flexible air valve during transit and storage and also can be utilized for exhausting air from the inflatable device.

2. Description of the Prior Art

The prior art is directed to methods and apparatus for flexible air valves for use in inflatable devices including, for example, above-the-ground swimming pools and air mattresses formed from polyvinylchloride sheeting and typically used in the out-of-doors.

Inflatable products are typically fashioned from flexible polymer materials such as, for example, polyvinylchloride. As the strength of flexible polymer materials has improved over the years, inflatable product sizes have also increased. Inflatable items such as small diameter above-the-ground swimming pools having inflatable stacked wall rings of 2"-to-3" in diameter have grown to larger pool sizes of up to twelve feet in diameter having inflatable stacked wall rings of 10"-to-12" in diameter.

Each of the inflatable stacked wall rings must include an air valve to insert air into the inflatable device and typically a second valve to exhaust air from the inflatable device. The inserting of air into the inflatable device is typically accomplished by the use of a manual foot-operated pump or an electric air pump. The air pressure generated by the air pump is delivered to the inflatable device via an air hose. The air pump hose typically has a diameter larger than the inside diameter dimension of the opening of the inflation air valve fitted in the inflatable device. In order to interface the hose from the air pump to the inflation air valve, a needle nose adapter or reducer is employed. A needle nose adapter or reducer is normally fitted on the end of the air hose and used for all inflatable devices. The needle-nose adapter enables a standard size air hose extending from the air pump to be force-fitted into the inflation air valve for charging the inflatable device with air.

However, the effectiveness of the air pump in delivering air to the inflatable device is controlled by the inside diameter dimension of the opening of the inflation air valve fitted within the inflatable device. Generally, the larger the inside diameter dimension of the inflation air valve, the greater the effectiveness of the pump in inflating the device. Unfortunately, the inside diameter dimension of the inflation air valves known in the prior art is small. Typically, the inside diameter dimension of an inflation air valve is $3/16"$ or $5/16"$. In practice, these two sizes represent the largest inflation air valves available in the prior art. For comparison purposes, the $3/16"$ diameter air valve has a cross-sectional area of approximately $0.0276\ in^2$ while the $5/16"$ diameter air valve has a cross-sectional area of approximately $0.0767\ in^2$.

An inflation air valve having a larger diameter and a greater cross-sectional area would result in increased effectiveness of the inflation air pump. However, several reasons exist for the absence of inflation air valves having a larger diameter and a greater cross-sectional area. Notwithstanding the manufacturer, all inflatable products including inflation air valves are tightly packed in a box or a polybag for shipping and storing. Thus, all excess air located inside the product is forced out during the packing stage of the inflatable products. Consequently, the inflatable products are literally vacuum packed and larger air valves comprised of flexible polymer materials and having an inside diameter dimension of, for example, ½ or greater can be easily crushed or deformed. However, the same tight vacuum packing technique does not damage the smaller inflation air valves having the inside diameter dimensions of $3/16"$ and $5/16"$. This is the case since the smaller inflation air valves are more compact with less exposed surface area and thus less vulnerable to damage.

This constant concern of damage and deformation has prevented larger, flexible inflation air valves from being used to maximize the flow of air into inflatable products from the air pump without the need for small needle nose adapters. The inflation air valves fashioned from the flexible polymer material are subject to various U.S. Government regulations directed to, for example, air leakage standards. Experience has shown that damaged or deformed inflation air valves do not recover their shape and consequently do not meet the U.S. Government or other European air leakage standards. For example, in certain products if the top air sealing cap of the inflatable product is inadvertently removed, the inflatable product must not leak more than one-half of the inflation pressure over a sixty minute period. Additionally, if the inflation air valve is deformed, the bottom back pressure flap will not function properly resulting in excessive air leakage.

Efforts by others in the past to solve these problems have resulted in rigid polymer air valves for use in inflatable products. An example of a rigid polymer air valve includes the Boston Valve which is not subject to damage or deformation caused by shipping and storing when packed in a very tight manner. However, the development and manufacturing process is very expensive resulting in high wholesale and retail prices. Further, it is intended to employ the inflation air valve in products made from flexible polyvinylchloride sheeting such as an inflatable, above-the-ground swimming pool. These products are intended for use by children and thus incorporating a rigid polymer air valve into the design may not satisfy applicable safety standards.

Thus, there is a need in the art for an oversized air valve having a removable rigid insert for providing an anti-deformation feature and an air exhausting feature which includes a large inside diameter dimension for maximizing the flow of air into an inflatable device without the need for a small needle nose adapter, and where the removable rigid insert when partially inserted inside the oversized air valve prevents damage and deformation to the air valve during shipping and storage which enables the air valve to be comprised of a flexible polymer material such as polyvinylchloride, and where the removable rigid insert when fully inserted inside the oversized air valve enables the exhausting of pressurized air from the inflatable device.

SUMMARY OF THE INVENTION

Briefly, and in general terms, the present invention provides a new and improved oversized air valve for use with inflatable devices and method therefore which is typically incorporated into an above-the-ground swimming pool or an air mattress. The oversized air valve is comprised of a flexible polymer material such as polyvinylchloride and includes a removable rigid insert for providing an anti-deformation feature and an air exhausting feature. The oversized air valve includes a large inside diameter dimension for maximizing the flow of air from an air pump and an air hose to an inflatable device without the need for a small needle nose adapter.

In a preferred embodiment, the oversized air valve includes an outer housing having a base flange for being fused to an inflatable device such as by Radio Frequency welding. A cylindrical passageway which serves as an air inlet is formed through the outer housing for carrying pressurized air delivered by an air pump and an air hose. A back pressure flap is hinged to the bottom of the cylindrical passageway for preventing escape of the air injected into the charged inflatable device. An attached cap is provided for sealing the cylindrical passageway against air leakage. The oversized air valve also includes a removable rigid polymer insert for providing either an anti-deformation feature or an air exhausting feature.

In the present invention, the removable rigid insert is comprised of a rigid polymer material which is force-fitted into the cylindrical passageway. The length of the rigid insert is sufficient to displace the back pressure flap attached to the bottom of the cylindrical passageway. When partially inserted in the cylindrical passageway, the rigid insert prevents damage and deformation to the oversized air valve during shipping and storage thereof. The anti-deformation feature enables the oversized air valve to be comprised of a flexible polymer material such as polyvinylchloride without being damaged. The rigid insert is removable when the oversized air valve is not being shipped or stored. When fully inserted into the cylindrical passageway of the oversized air valve, the rigid insert in combination with a plurality of fingers protruding from the bottom thereof enables the back pressure flap to be displaced about its hinge. Displacement of the back pressure flap enables the pressurized air trapped inside the inflatable device to be exhausted. When not being used for exhausting pressurized air from the inflatable device, the rigid insert is removed from the cylindrical passageway.

The present invention is generally directed to an oversized air valve for use with inflatable devices such as an above-the-ground swimming pool for use in the out-of-doors or, in the alternative, an air mattress. The inventive oversized air valve including the removable rigid insert provides a practical solution to the damage and deformation that result when the oversized air valves are tightly packed and shipped by the manufacturer to a destination. Likewise, the oversized air valve including the removable rigid insert also provides a practical solution to exhausting the pressurized air from a charged inflatable device. In its most fundamental embodiment, the oversized air valve for use with inflatable devices includes a construction having an outer housing and a base flange connected to the outer housing for being secured to an inflatable device. A cylindrical passageway is formed through the outer housing for carrying pressurized air. A cap attached to the cylindrical passageway enables the air valve to be sealed against air leakage. Finally, a removable rigid member is insertable into the cylindrical passageway for preventing deformation to the air valve.

In an alternative embodiment, the oversized air valve for use with inflatable devices includes a construction similar to the oversized air valve of the preferred embodiment. The alternative embodiment includes an outer housing having a base flange formed thereon, a cylindrical passageway which serves as an air inlet for carrying pressurized air, a back pressure flap for preventing escape of the air injected into the charged inflatable device, and a cap attached to the cylindrical passageway by a first flexible lead for sealing the cylindrical passageway against air leakage. In addition, the alternative embodiment includes a rigid member in the form of a deflation insert attached to the cylindrical passageway by a second flexible lead. The deflation insert includes a cylindrical penetration therethrough and a protuberance extending therefrom which is used for displacing the back pressure flap hinged to the bottom of the cylindrical passageway during both injecting and exhausting pressurized air into and from the inflatable device.

These and other objects and advantages of the present invention will become apparent from the following more detailed description, taken in conjunction with the accompanying drawings which illustrate the invention, by way of example.

DESCRIPTION OF THE INVENTION

Figure 1:
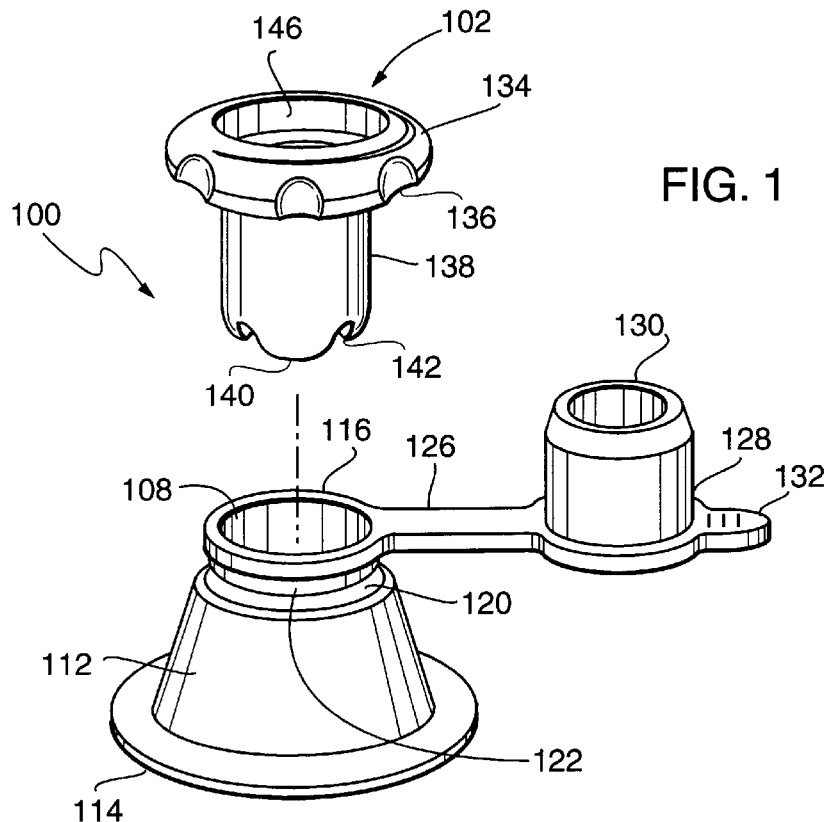
FIG. 1 is a perspective view of an oversized air valve for use with inflatable devices of the present invention showing a cylindrical-shaped, removable rigid insert exploded away from the oversized air valve.
Figure 2:
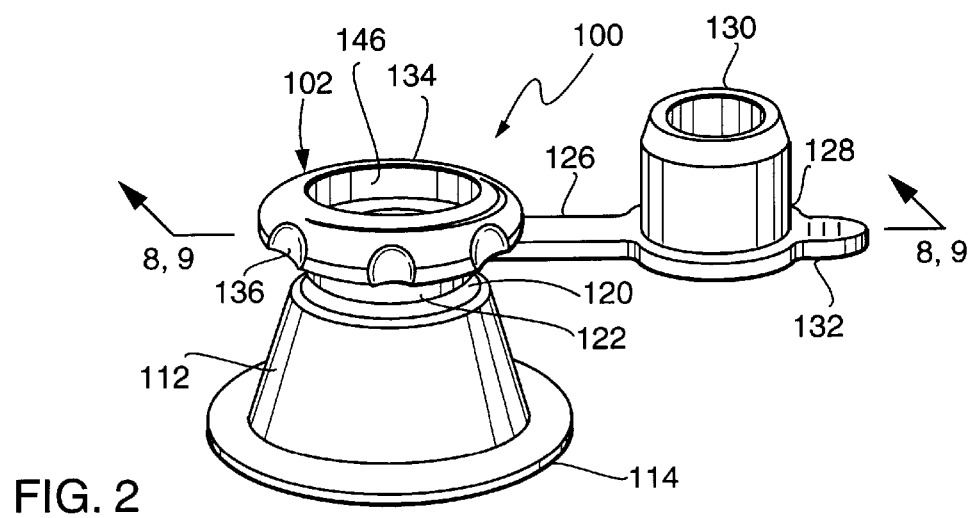
FIG. 2 is another perspective view of the oversized air valve of FIG. 1 showing the removable rigid insert positioned within the cylindrical passageway of the air valve for providing an anti-deformation feature.

The present invention is an oversized air valve 100 as shown in FIGS. 1 and 2 having a removable, cylindrical-shaped rigid synthetic insert 102 and method therefore. The oversized air valve 100, which can be comprised of a flexible polymer material such as polyvinylchloride (PVC), is typically employed in an inflatable device 104 such as, for example, an inflatable type swimming pool or an inflatable mattress as shown in FIG. 10.

The oversized air valve 100 having the rigid insert 102 provides a combination of advantages including (a) a higher air volume rate, (b) an anti-deformation feature, and (c) an air exhausting feature. The oversized air valve 100 exhibits a large inside diameter dimension that passes a greater volume of air to and from the inflatable device 104 without the need for a small needle nose adapter (not shown). Consequently, use of the oversized air valve 100 results in greater efficiency of a manual or electric air pump 106 shown in FIG. 10. Positioning of the rigid insert 102 partly (i.e., partially inserted) into a cylindrical passageway 108 of the air valve 100 during transit and storage periods prevents the flexible polymer material of the air valve 100 from being damaged and distorted. In addition, positioning the rigid insert 102 further (i.e., fully inserted) into the cylindrical passageway 108 of the air valve 100 opens a back pressure flap 110 for exhausting air from the inflatable device 104 shown in FIG. 10.

Figure 3:
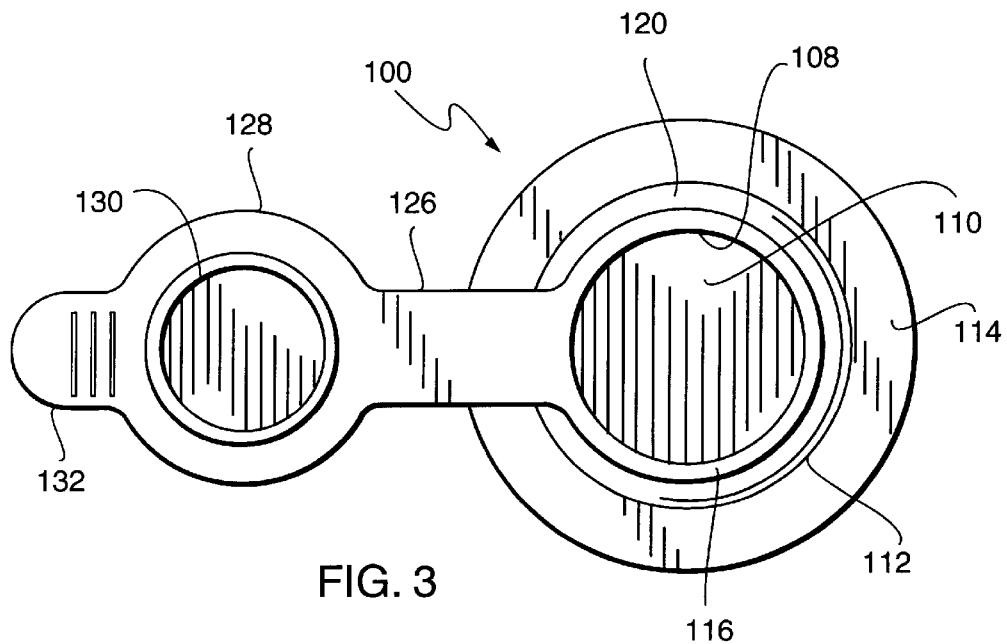
FIG. 3 is a top planar view of the oversized air valve of FIG. 1 showing an outer housing, base flange, attached air sealing cap, cylindrical passageway and a back pressure flap in the closed position.
Figure 8:
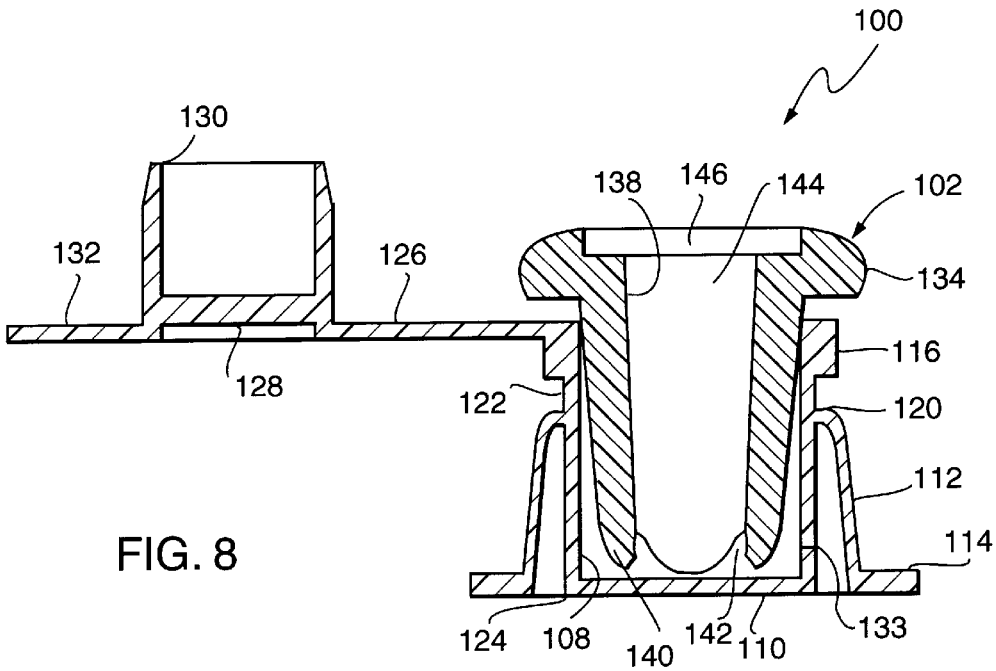
FIG. 8 is a cross-sectional view of the oversized air valve of FIG. 1 taken along the line 8—8 of FIG. 2 and showing the removable rigid insert partially inserted within the cylindrical passageway of the air valve for anti-deformation purposes and with the back pressure flap closed.
Figure 9:
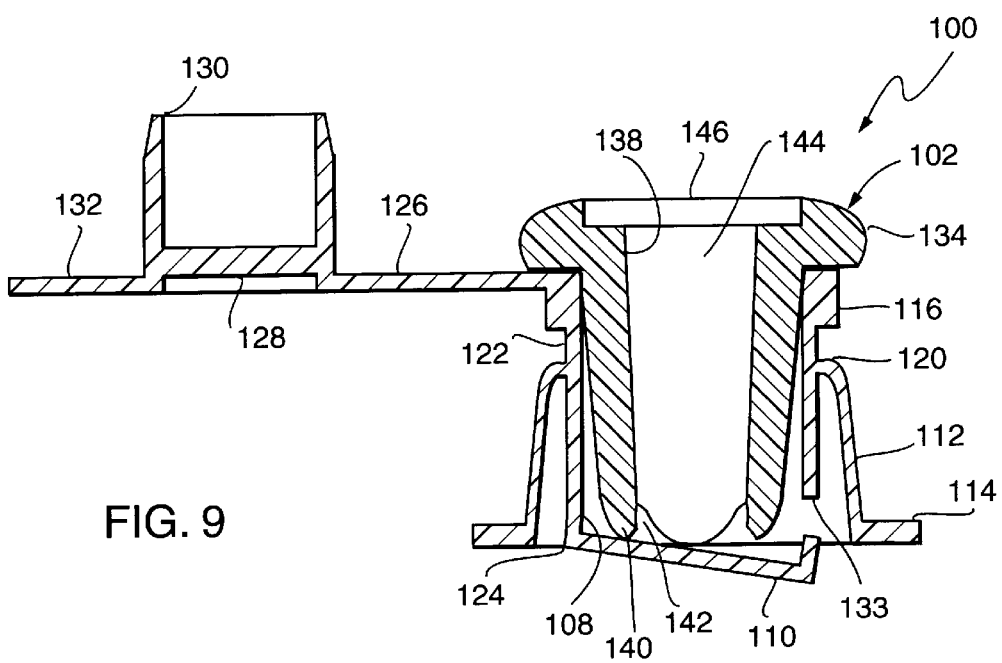
FIG. 9 is a cross-sectional view of the oversized air valve of FIG. 1 taken along the line 9—9 of FIG. 2 and showing the removable rigid insert fully inserted within the cylindrical passageway of the air valve with the back pressure flap open for injecting and exhausting air.
Figure 10:
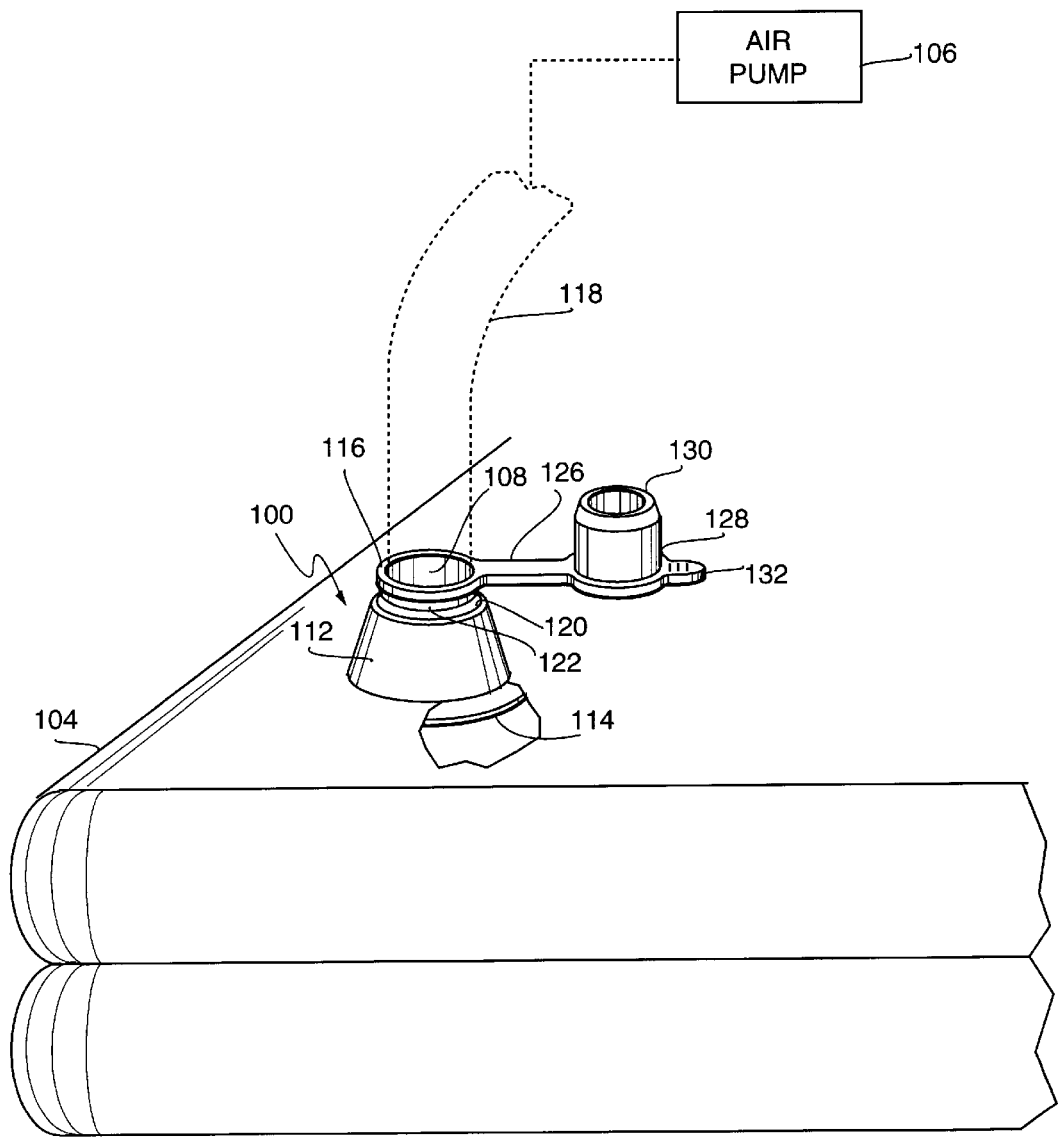
FIG. 10 is a perspective view with partial cutaway of the oversized air valve of FIG. 1 showing the air valve connected to an air pump via an air hose and with the air valve mounted in an inflatable device.

The preferred embodiment of the present invention of the oversized air valve 100 is illustrated in FIGS. 1–10 herein. The general structure of the oversized air valve 100 is shown in FIGS. 1–2 and includes an outer housing 112 having a base flange 114 attached to the bottom of the outer housing 112. The external surface of the outer housing 112 is formed in the shape of a truncated frustum as shown in FIGS. 1 and 2. The base flange 114 is integrally formed to the outer housing 112 and serves to attach the oversized air valve 100 to the inflatable device 104 as by Radio Frequency (RF) sealing as shown in FIG. 10. Referring to FIGS. 3, 4, 8 and 9, it can be seen that the truncated frustum shape of the outer housing 112 is hollow inside. Formed through the center of the outer housing 112 is the cylindrical passageway 108. The function of the cylindrical passageway 108 shown clearly in the top planar view of FIG. 3 is to enable the passage of pressurized air therethrough.

The cylindrical passageway 108 includes a top annular ring 116 fused at the very top of the outer housing 112 as shown in FIGS. 3, 8 and 9. The top annular ring 116 has a heavier thickness dimension than the remainder of the cylindrical passageway 108. The reinforced nature of the top annular ring 116 results in a more robust construction. This feature is significant since the top annular ring 116 must interface with an air hose 118 that carries pressurized air from the air pump 106 to the inflatable device 104 as shown in FIG. 10. The air hose 118 typically has a standard fitting attached at the end thereof which is employed to directly interface with the top annular ring 116 of the cylindrical passageway 108 via a compression fit. The top annular ring 116, the cylindrical passageway 108, the outer housing 112 and the base flange 114 are each comprised of the flexible polymer, i.e., polyvinylchloride. The air hose 118 is a flexible tube which is also typically comprised of a plastic as known in the art.

The inside diameter dimension of the cylindrical passageway 108 of the present invention is large compared to the corresponding dimension of the air valves of the prior art. The inside diameter dimension of the cylindrical passageway 108 can be, for example, ¾", which has a cross-sectional area of approximately 0.4418 in$^2$. This inside diameter dimension enables the cylindrical passageway 108 to accept the standard fitting of the air hose 118 without the need for a needle nose adapter or reducer (not shown) that was required in the prior art. Elimination of the needle nose adapter or reducer (not shown) results in improved performance and efficiency of the air pump 106 because the constriction in the air supply has been eliminated. In fact, the oversized air valve 100 of the present invention can have openings sixteen-hundred percent (1600%) larger in area than the smallest air valves of the prior art. Thus, the pressurized air generated by the air pump 106 is forced through the air hose 118 and the cylindrical passageway 108 to the inflatable device 104. During manual deflation of the inflatable device 104, the large cylindrical passageway 108 of the oversized air valve 100 enables the deflation of the inflatable device 104 to be accelerated.

The thickness (or outside diameter) of the cylindrical passageway 108 is reduced immediately beneath the top annular ring 116 as is shown in FIGS. 8 and 9. It is noted that the inside diameter dimension is constant throughout the cylindrical passageway 108, i.e., the inside diameter dimension of the top annular ring 116 corresponds to the inside diameter dimension of the remainder of the cylindrical passageway 108. Just beneath the top annular ring 116, the outer housing 112 merges with the cylindrical passageway 108 forming an annular ledge 120 as is clearly shown in FIGS. 8 and 9. That portion of the cylindrical passageway 108 that is between the top annular ring 116 and the annular ledge 120 forms a collar 122 as shown best in FIGS. 8 and 9.

Figure 4:
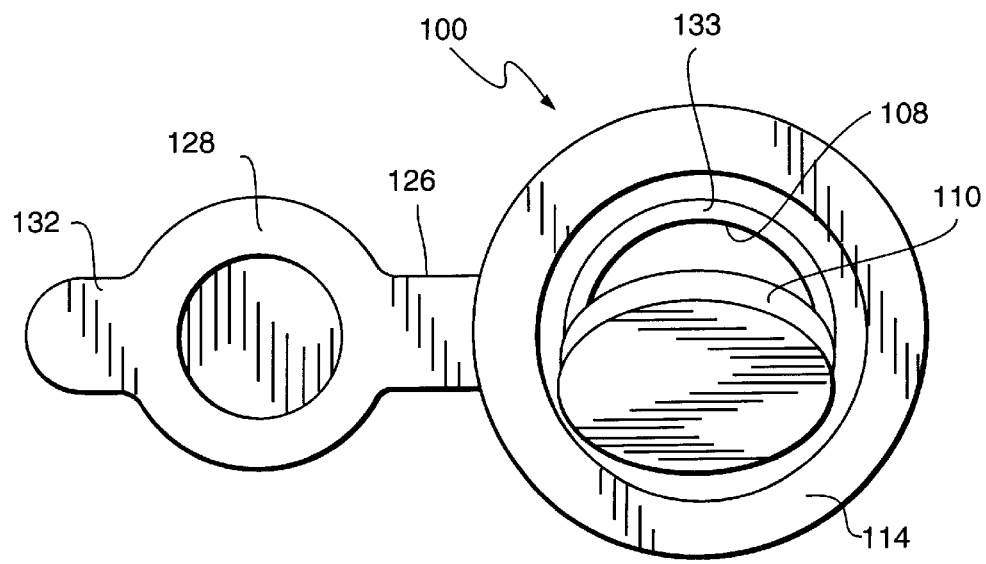
FIG. 4 is a bottom planar view of the oversized air valve of FIG. 1 showing the attached air sealing cap, base flange, cylindrical passageway and back pressure flap in the open position.

Attached to the bottom of the cylindrical passageway 108 is the back pressure flap 110 as is clearly shown in FIGS. 4 and 9. The entire oversized air valve 100 is formed in a molding process. When the oversized air valve 100 is initially molded, the bottom of the cylindrical passageway 108 is integral, i.e., the back pressure flap 110 has not yet been formed. Subsequently, the back pressure flap 110 is formed by cutting or slicing approximately eighty-percent (80%) of the circumference of the bottom of the cylindrical passageway 108. Thereafter, the back pressure flap 110 forms a disk with sides that can be rotated about that portion of the cylindrical passageway 108 that was not sliced. That portion of the cylindrical passageway 108 by which the back pressure flap 110 remains connected to the cylindrical passageway 108 is referred to as a hinge 124 as can be seen in FIG. 9. The hinge 124 enables the back pressure flap 110 to remain connected to the cylindrical passageway 108 while the back pressure flap 110 is being moved by pressurized air.

Molded to the top annual ring 116 is a flexible lead 126 as is shown in FIGS. 1–4 and 8–10. The flexible lead 126 is employed to connect an air sealing cap or plug 128 to the oversized air valve 100. In the preferred embodiment, the air sealing cap 128 serves to prevent air leakage through the cylindrical passageway 108 in the case where the back pressure flap 110 is not tightly closed. The air sealing cap 128 includes a hollow cylindrical protuberance 130 so positioned and dimensioned as to be insertable into the cylindrical passageway 108 to prevent air passage therethrough. The flexible lead 126 is manipulated so that the air sealing cap 128 can be positioned within the cylindrical passageway 108. Extending from the air sealing cap 128 is a finger tab 132 which is utilized to assist in inserting and removing the air sealing cap 128 into and from the cylindrical passageway 108. The flexible lead 126, air sealing cap 128, hollow cylindrical protuberance 130 and finger tab 132 are each comprised of flexible polymer material such as polyvinylchloride.

The oversized air valve 100 is incorporated into the structure of the inflatable device 104 as is illustrated in FIG. 10 herein. In FIG. 10, the base flange 114 of the oversized air valve 100 is positioned underneath the typically flexible polymer material of the inflatable device 104. In FIG. 10, the inflatable device 104 is illustrated as an inflatable mattress but can be any suitable device including the stacked side wall rings of an inflatable swimming pool. Further, it is understood that the oversized air valve 100 can be mounted in the inflatable device 104 at a more suitable location. The oversized air valve 100 is shown mounted on top of the upper surface of the inflatable device 104 for illustrative purposes only but can be mounted on a side wall or other suitable location thereof.

In operation, the oversized air valve 100 is connected to the air pump 106 via the air hose 118 as is shown in FIG. 10. During the charging period, the air pump 106 generates pressurized air that passes through the air hose 118 to the cylindrical passageway 108 of the oversized air valve 100. The pressurized air applies a pressure onto the back pressure flap 110 in a direction that forces the hinge 124 to operate. The operation of the hinge 124 causes the back pressure flap 110 to open to admit pressurized air into the inflatable device 104. After the inflatable device 104 is charged with pressurized air, the pressure build-up within the inflatable device 104 eventually causes the back pressure flap 110 to be forced onto a valve seat 133 into the closed position as is shown in FIG. 8. Consequently, the oversized air valve 100 exhibits a one-way valve structure. Notwithstanding, the one-way oversized air valve 100 can be manually opened with a suitable object to initiate deflation of the inflatable device 104.

The oversized air valve 100 of the present invention also includes the removable rigid insert 102 for providing two important advantageous functions. The two important functions include an anti-deformation feature and an air exhausting feature. During tight packaging, transit and storage of large air valves of the prior art, it was common for them to be damaged, deformed and subsequently fail to function properly. The damaged air valves then typically failed to satisfy the required leakage and safety standards. The removable rigid insert 102 solves this problem in that it is positioned inside the cylindrical passageway 108 during periods of tight packaging, transit and storage.

Figure 5:
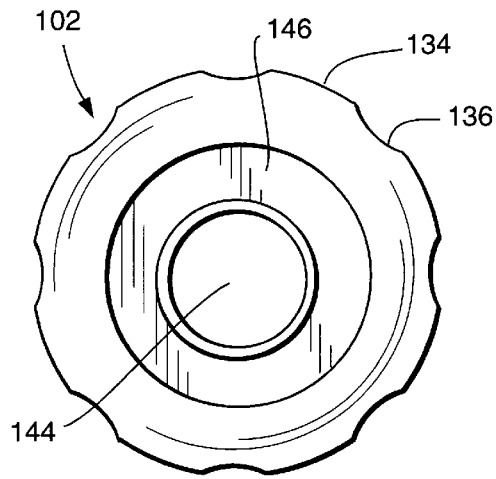
FIG. 5 is a top planar view of the removable rigid insert of the oversized air valve of FIG. 1 showing an upper lip having a scalloped outer edge, a top recess and a penetration through the rigid insert.
Figure 6:
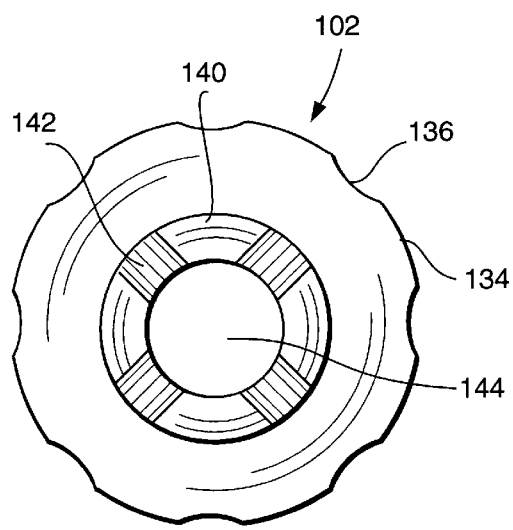
FIG. 6 is a bottom planar view of the removable rigid insert of the oversized air valve of FIG. 1 showing the upper lip having the scalloped outer edge and a plurality of fingers and slots extending from the bottom of the rigid insert.
Figure 7:
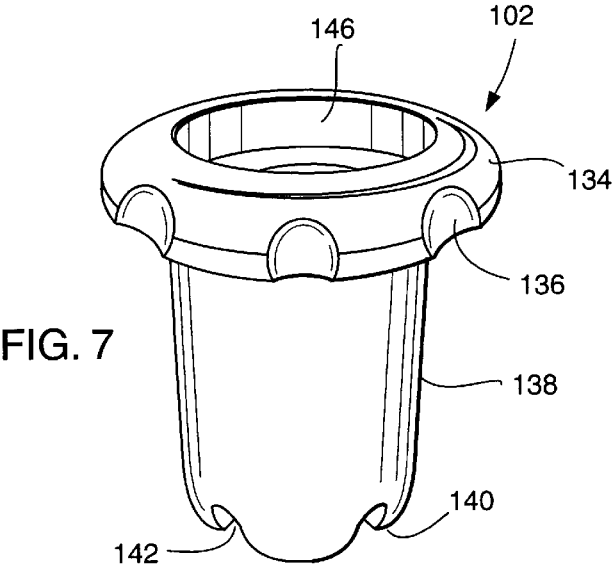
FIG. 7 is a perspective view of the removable rigid insert of the oversized air valve of FIG. 1 showing the scalloped upper lip, shaft and plurality of finger protuberances and slots for providing an anti-deformation feature and an air exhausting feature.

The construction of the removable rigid insert 102 of the oversized air valve 100 is illustrated in FIGS. 5–7 herein. The insert 102 includes an upper lip 134 formed at the top of the insert 102 to serve as a limit stop when it is inserted into the cylindrical passageway 108 of the oversized air valve 100. The upper lip 134 includes a scalloped outer edge 136 shown best in FIG. 5 which assists in the grasping and holding the upper lip 134. A shaft 138 of the removable rigid insert 102 is cylindrical so that it is compatible with the inside surface of the cylindrical passageway 108. At the bottom of the shaft 138 is a plurality of fingers 140 best shown in FIGS. 6 and 7. A slot 142 is formed between adjacent fingers of the plurality of fingers 140 as shown in FIGS. 6 and 7. The removable rigid insert 102 includes a cylindrical penetration 144 formed therethrough best shown in FIGS. 5 and 6. A cylindrical recess 146 is formed within the upper lip 134 at the top of the cylindrical penetration 144 as shown in FIGS. 5, 7 and 8.

The diameter of the removable rigid insert 102 is such that it must be force-fitted into the cylindrical passageway 108 of the oversized air valve 100. Unlike the softer, flexible polymer material used to form the oversized air valve 100 (including the cylindrical passageway 108), the removable rigid insert 102 is comprised of a hard rigid polymer material such as, for example, nylon, or polyproplene. The removable rigid insert 102 is inserted to less than the full length of the cylindrical passageway 108 as shown in FIG. 8. This is easily accomplished since the removable rigid insert 102 must be force-fitted into the cylindrical passageway 108.

The removable rigid insert 102 shown in FIG. 8 is force-fitted into the cylindrical passageway 108 only to the desired position. Note that a portion of the rigid insert 102 extends above the top annular ring 116 as shown in FIG. 8. The shaft 138 of the removable rigid insert 102 will prevent damage and deformation to the oversized air valve 100 during tight packaging, transit and storage. Thus, the undamaged and undeformed oversized air valve 100 can directly accept the air hose 118 which enables the air pump 106 to operate at a higher efficiency. Further, the undamaged oversized air valve 100 will satisfy the required Federal leakage and other safety standards. Additionally, the back pressure flap 110 remains on the valve seat 133 so that the back pressure flap 110 does not lose its memory and remain permanently open. This is the situation illustrated in FIG. 8.

The second important feature of the removable rigid insert 102 is the air exhausting feature. If the inflatable device 104 is charged with pressurized air, it can be promptly exhausted by employing the removable rigid insert 102 shown in FIG. 7. The removable rigid insert 102 can be force-fitted through the entire length of the cylindrical passageway 108 so that the plurality of fingers 140 formed on the bottom of the insert 102 will force the back pressure flap 110 off of its valve seat 133. Even if the air pressure within the inflatable device 104 forces the back pressure flap 110 back toward the valve seat 133, the plurality of fingers 140 will cause the back pressure flap 110 to be displaced from the valve seat 133. Under these conditions, the pressurized air within the inflatable device 104 can exhaust through the open valve seat 133 of the back pressure flap 110, the slots 142 between the plurality of fingers 140, and the cylindrical penetration 144 of the removable rigid insert 102. This is the situation illustrated in FIG. 9 which exhibits the removable rigid insert 102 shown in FIG. 7 fully inserted into the cylindrical passageway 108.

Thus, it can be seen that the oversized air valve 100 of the present invention can be utilized for both insertion of pressurized air into the inflatable device 104 and the exhausting of pressurized air from the inflatable device 104 with the use of the removable rigid insert 102. Consequently, inflatable devices 104 such as inflatable mattresses and inflatable above-the-ground swimming pools now require only a single air valve per inflatable air chamber for both injecting and exhausting of pressurized air. This feature provides a distinct economic advantage to the use of the oversized air valve 100.

An alternative embodiment of the oversized air valve for use with inflatable devices of the present invention is shown in FIGS. 11–14 and is referred to by the identification number 200. Each of the components appearing in the alternative embodiment 200 that correspond in structure and function to those components appearing in the preferred embodiment 100 is identified by the corresponding number of the 200 series.

Figure 11:
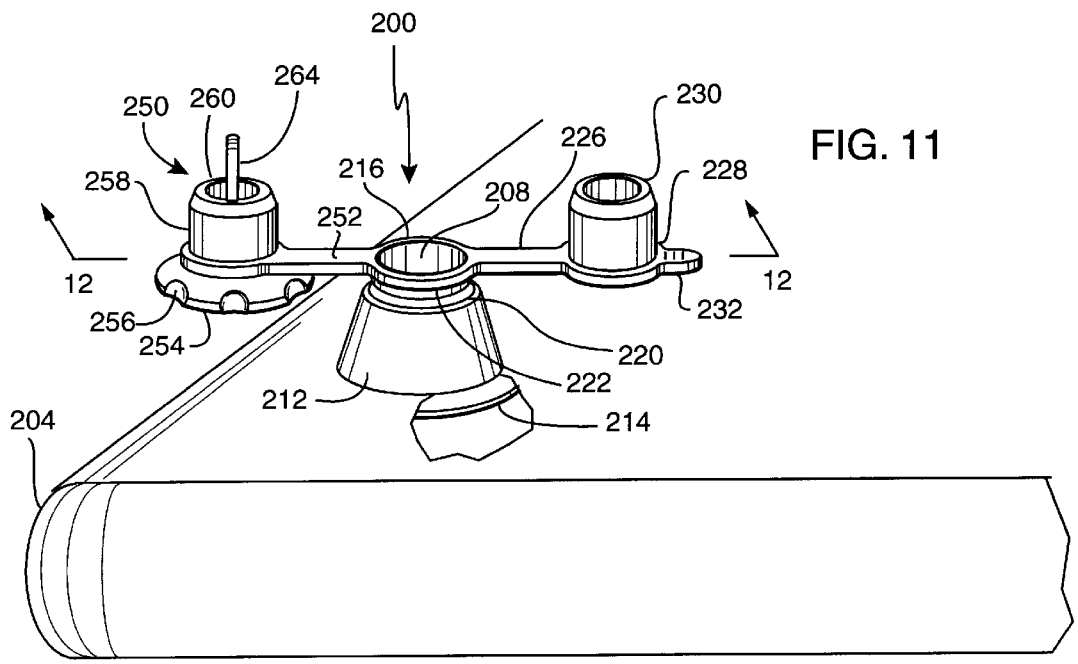
FIG. 11 is a perspective view with partial cutaway of an alternative embodiment of the oversized air valve of the present invention showing a deflation insert and an air sealing cap, each attached to the air valve and with the air valve mounted in an inflatable device.
Figure 12:
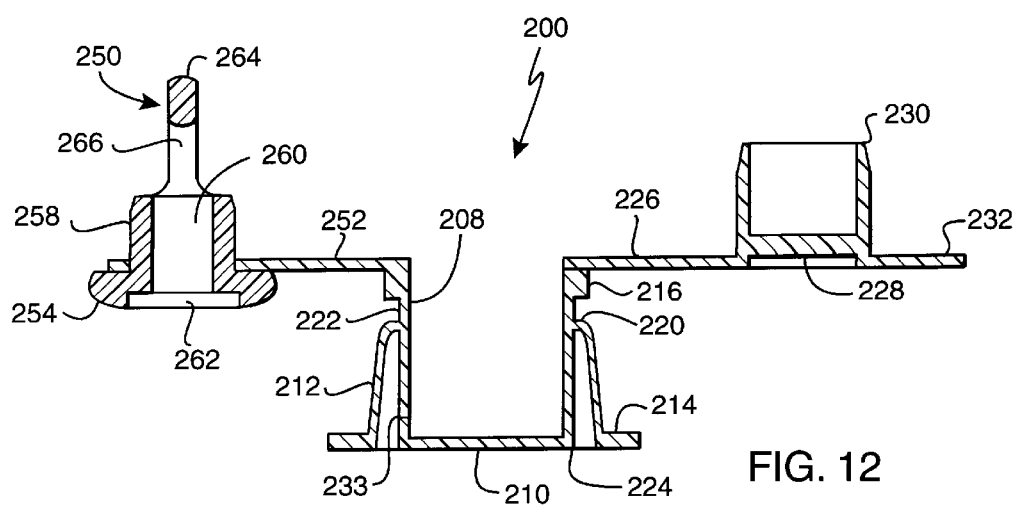
FIG. 12 is a cross-sectional view of the oversized air valve of the alternative embodiment of FIG. 11 taken along the line 12—12 of FIG. 11 and showing the deflation insert and the air sealing cap, each separately connected to the air valve by a flexible lead.
Figure 13:
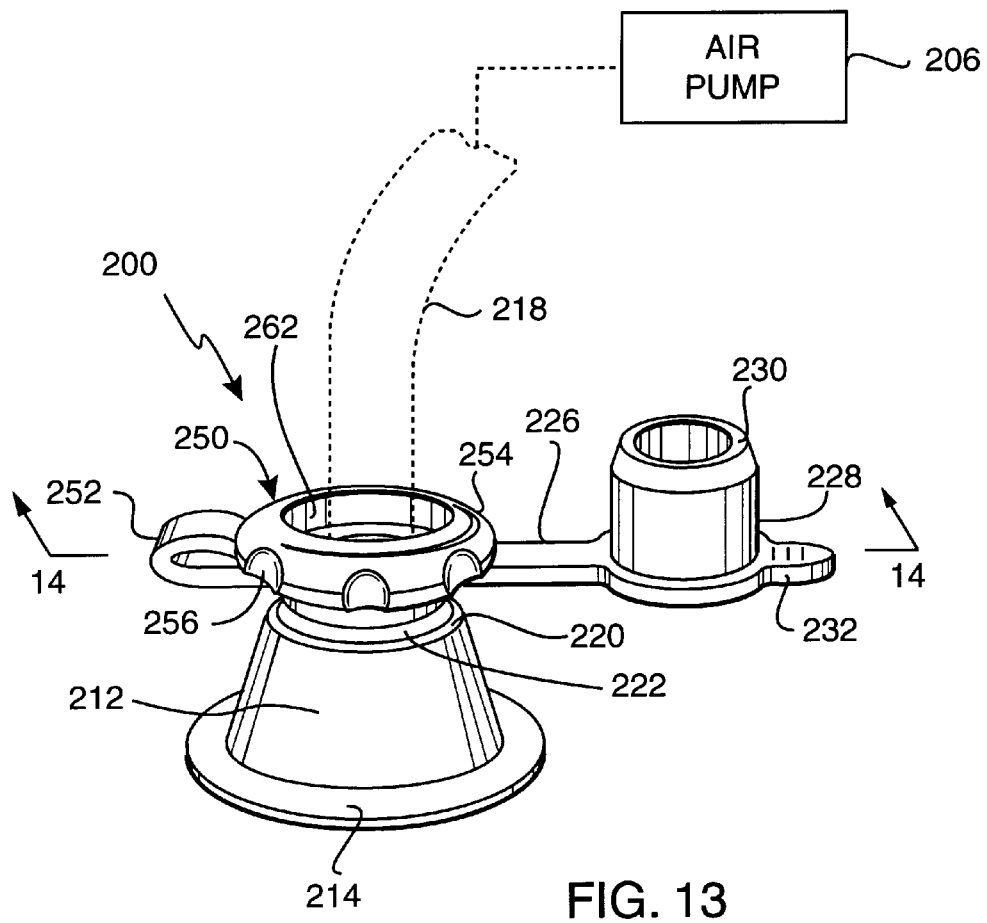
FIG. 13 is a perspective view of the alternative embodiment of the oversized air valve of the present invention showing the deflation insert inserted into the cylindrical passageway of the air valve and connected to an air pump via an air hose inserted into the top of the deflation insert.

The oversized air valve for use in inflatable devices appearing in the alternative embodiment 200 of the present invention manifests itself in an oversized air valve having both an attached deflation insert 250 and an attached air sealing cap 228 shown best in FIGS. 11 and 12. As in the preferred embodiment 100, an air pump 206 is employed in combination with an air hose 218 for generating pressurized air for injection into an inflatable device 204 as is shown in combined FIGS. 11 and 13. Additionally, the oversized air valve 200 comprises an outer housing 212 having a base flange 214 fused thereto as shown in FIG. 13. Formed through the center of the outer housing 212 is a cylindrical passageway 208 employed to carry pressurized air. Positioned at the bottom of the cylindrical passageway 208 is a back pressure flap 210 formed by slicing approximately eighty-percent (80%) of the bottom of the cylindrical passageway 208. After the formation of the back pressure flap 210, it remains connected to the bottom of the cylindrical passageway 208 by a hinge 224 and seated on a valve seat 233 as shown in FIG. 12.

Figure 14:
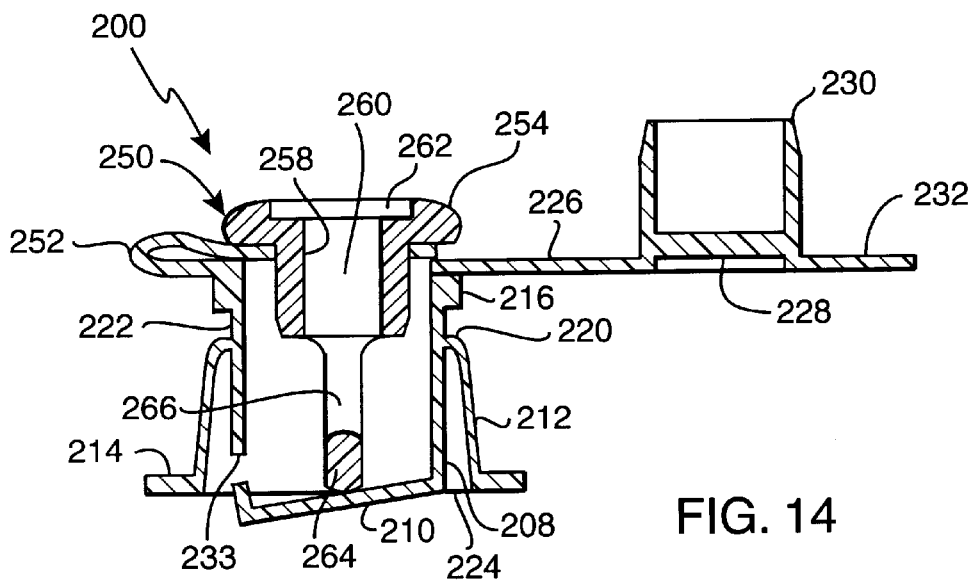
FIG. 14 is a cross-sectional view of the oversized air valve of the alternative embodiment of FIG. 13 taken along the line 14—14 of FIG. 13 and showing the deflation insert inserted into the cylindrical passageway and displacing the back pressure flap.

A top annular ring 216 is formed about the top portion of the cylindrical passageway 208. The top annular ring 216 has an increased outer diameter when compared to the same dimension of the remainder of the cylindrical passageway 208. The air sealing cap 228 and the deflation insert 250 each interface with the top annular ring 216 as shown in FIG. 13. The point at which the outer housing 212 contacts the cylindrical passageway 208 forms an annular ledge 220 as is best shown in FIG. 13. That portion of the outer surface of the cylindrical passageway 208 positioned between the top annular ring 216 and the annular ledge 220 forms a collar 222 as shown in FIGS. 12 and 14. The air sealing cap 228 includes a hollow cylindrical protuberance 230 for fitting within and sealing the cylindrical passageway 208 and also includes a finger tab 232 for manipulation of the air sealing cap 228. The air sealing cap 228 is connected to the top annular ring 216 by a first flexible lead 226 as shown in FIGS. 11–14. Each of the above recited components of structure of the oversized air valve 200 identified by a number of the two-hundred series (except the deflation insert 250) is identical in structure and function as the corresponding component of the oversized air valve 100 of the preferred embodiment.

In the alternative embodiment of the oversized air valve 200, the attached air sealing cap 228 serves an additional function. The hollow cylindrical protuberance 230 of the air sealing cap 228 functions to seal the cylindrical passageway 208 against leakage after the inflatable device 204 has been charged with pressurized air. During periods of non-use as when the oversized air valve 200 is being packaged, transmitted or stored or when the inflatable device 204 is deflated and idle, the hollow cylindrical protuberance 230 of the air sealing cap 228 functions to prevent damage and deformation to the air valve 200. The base of the hollow cylindrical protuberance 230 of the air sealing cap 228 as shown in FIG. 12 is stiff and thus when inserted in the cylindrical passageway 208 serves to prevent damage and distortion to the oversized air valve 200. Thus, during idle periods, the hollow cylindrical protuberance 230 should be inserted into the cylindrical passageway 208.

The deflation insert 250 is shown tethered to the top annular ring 216 by a second flexible lead 252 as shown in FIGS. 11–14. The second flexible lead 252 is comprised of flexible polyvinylchloride as is the first flexible lead 226. Both the first flexible lead 226 and the second flexible lead 252 function to connect the air sealing cap 228 and the deflation insert 250, respectively, to the top annular ring 216. In the oversized air valve 200, the deflation insert 250 is employed for both inflation and deflation of pressurized air into and from the inflatable device 204. Additionally, the deflation insert 250 is also comprised of a polymer material such as polyvinylchloride. However, the polymer material which is utilized to form the deflation insert 250 is stiffer than the flexible polyvinylchloride use to fashion the remainder of the components of the oversized air valve 200.

The deflation insert 250 includes an upper lip 254 having a scalloped outer edge 256 as is clearly shown in FIGS. 11 and 13. Positioned below the upper lip 254 is a cylindrical body 258 having a cylindrical penetration 260 formed therethrough as shown in FIGS. 12 and 14. Formed on the top of the upper lip 254 and in communication with the cylindrical penetration 260 is a cylindrical recess 262. Extending from the bottom of the cylindrical body 258 is a finger protuberance 264 which can span across the bottom of the cylindrical body 258 forming a pair of open ports 266 as is best shown in FIG. 11. It is noted that a continuous path for air extends from the cylindrical recess 262 down through the cylindrical penetration 260 and out the pair of open ports 266. It is further noted that the construction of the finger protuberance 264 and the pair of open ports 266 of the deflation insert 250 resembles the construction of a air needle for a basketball.

The deflation insert 250 of the oversized air valve 200 is employed to inject pressurized air into the inflatable device 204 in the following manner. The deflation insert 250 as shown in FIGS. 11 and 12 is inserted into the cylindrical passageway 208 of the oversized air valve 200 as shown in FIG. 13. The cylindrical body 258 of the deflation insert 250 is force-fitted into the cylindrical passageway 208. The finger protuberance 264 then extends downward to displace the back pressure flap 210 off of the valve seat 233 as shown in FIG. 14. The air hose 218 is then inserted into the cylindrical recess 262 positioned immediately above the cylindrical penetration 260 of the deflation insert 250. The diameter of the cylindrical recess 262 is designed to directly accommodate the air hose 218.

When the air pump 206 is operational, pressurized air passes downward through the air hose 218 into the cylindrical recess 262, the cylindrical penetration 260, out of the pair of open ports 266 of the finger protuberance 264 and through the opened back pressure flap 210 as shown in FIGS. 13 and 14 to inject air into the inflatable device 204. After the pressurized air generated by the air pump 206 has been injected, air pressure within the inflatable device 204 causes the back pressure flap 210 to be forced against the valve seat 233 as is shown in FIG. 12. The deflation insert 250 and the air hose 218 are then removed from the cylindrical passageway 208 and replaced with the air sealing cap 228 to prevent leakage through the oversized air valve 200.

The deflation insert 250 of the oversized air valve 200 is utilized to deflate an air charged inflatable device 204 in the following manner. The air sealing cap 228 is initially removed from the cylindrical passageway 208. The deflation insert 250 is then inserted into the top of the cylindrical passageway 208 to a depth sufficient for the finger protuberance 264 to force the back pressure flap 210 off of the valve seat 233 as shown in FIG. 14. This action creates an escape path for the pressurized air through the displaced back pressure flap 210, into the pair of open ports 266, through the cylindrical penetration 260 and the cylindrical recess 262 of the cylindrical body 258, and out to atmosphere. After deflation, the deflation insert 250 is removed and the air sealing cap 228 is then re-inserted into the cylindrical passageway 208 to prevent the oversized air valve 200 from being damaged or deformed.

The present invention provides novel advantages over other air valves for use in inflatable devices known in the prior art. A main advantage of the oversized air valve 100 of the present invention is that it exhibits a much larger inside diameter dimension than other similar air valves known in the past and thus enables a greater volume of air to be inserted into and exhausted from the inflatable device 104 without the requirement of a small needle nose adapter. Consequently, use of the oversized air valve 100 results in greater efficiency of the air pump 106. Another main advantage is that when the removable rigid insert 102 is partially inserted within the cylindrical passageway 108, the oversized air valve 100 can be packed, shipped and stored for extended periods of time without deformation. Thus, the removable rigid insert 102 enables the oversized air valve 100 to be fashioned from soft, flexible polymer material. Additionally, the back pressure flap 110 of the oversized air valve 100 can be opened by fully inserting the removable rigid insert 102 into the cylindrical passageway 108 for exhausting air from the inflatable device 104. Thus, a further advantage is that the oversized air valve 100 functions both to insert air into and exhaust air from the inflatable device 104. Additionally, the oversized air valve 100 includes the attached air sealing cap 128 for sealing the cylindrical passageway 108 from air leakage. The oversized air valve 200 of the alternative embodiment includes an air sealing cap 228 and a deflation insert 250, each of which are attached to the cylindrical passageway 208 by separate flexible leads 226 and 252.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. An oversized air valve for use with inflatable devices comprising:
   an outer housing;
   a base flange connected to said outer housing for being secured to an inflatable device;
   a cylindrical passageway formed through said outer housing for carrying pressurized air;
   a cap attached to said cylindrical passageway for sealing against air leakage; and
   a removable rigid member insertable into said cylindrical passageway for preventing deformation to said air valve, said rigid member comprising a solid cylindrical body and a plurality of fingers extending downward from a bottom of said solid cylindrical body.

2. The oversized air valve of claim 1 wherein said air valve is comprised of a flexible polymer material.

3. The oversized air valve of claim 1 wherein said air valve is comprised of flexible polyvinylchloride.

4. The oversized air valve of claim 1 wherein said air valve includes a ¾" inside diameter dimension.

5. The oversized air valve of claim 1 wherein said removable rigid member is comprised of a rigid polymer.

6. The oversized air valve of claim 1 wherein said removable rigid member is comprised of polyproplene.

7. The oversized air valve of claim 1 wherein said removable rigid member is comprised of nylon.

8. The oversized air valve of claim 1 wherein said cap is attached to said cylindrical passageway with a flexible lead comprised of polyvinylchloride.

9. The oversized air valve of claim 1 wherein said cap attached to said cylindrical passageway further includes a finger tab.

10. An oversized air valve for use with inflatable devices comprising:
    an outer housing;
    a base flange connected to said outer housing for being secured to an inflatable device;
    a cylindrical passageway formed through said outer housing for carrying pressurized air;
    a back pressure flap hinged to a bottom of said cylindrical passageway; and
    a removable rigid member insertable into said cylindrical passageway for displacing said back pressure flap and for exhausting said pressurized air from said inflatable device, said rigid member comprising a solid cylindrical body and a plurality of fingers extending downward from a bottom of said solid cylindrical body.

11. An oversized air valve for use with inflatable devices comprising:
    an outer housing;
    a base flange connected to said outer housing for being secured to an inflatable device;
    a cylindrical passageway formed through said outer housing for carrying pressurized air;
    a back pressure flap hinged to a bottom of said cylindrical passageway; and
    a removable rigid member for inserting into said cylindrical passageway, said rigid member comprising
    a solid cylindrical body;
    an upper lip fused to said solid cylindrical body; and
    a plurality of fingers extending downward from said solid cylindrical body.

12. An oversized air valve for use with inflatable devices comprising:
    an outer housing;
    a base flange connected to said outer housing for being secured to an inflatable device;
    a cylindrical passageway formed through said outer housing for carrying pressurized air;
    a back pressure flap hinged to a bottom of said cylindrical passageway;
    a cap attached to said cylindrical passageway with a first flexible lead for sealing against air leakage; and
    a rigid member attached to said cylindrical passageway with a second flexible lead and insertable into said cylindrical passageway for displacing said back pressure flap for injecting and exhausting said pressurized air into and from said inflatable device.

13. The oversized air valve of claim 12 wherein said rigid member further includes a cylindrical base.

14. The oversized air valve of claim 13 wherein said cylindrical base of said rigid member further includes a protuberance for displacing said back pressure flap.

15. The oversized air valve of claim 12 wherein said first flexible lead for attaching said cap to said cylindrical passageway is comprised of polyvinylchloride.

16. The oversized air valve of claim 12 wherein said second flexible lead for attaching said rigid member to said cylindrical passageway is comprised of polyvinylchloride.

17. The oversized air valve of claim 12 wherein said cap is insertable into said cylindrical passageway for preventing deformation of said air valve.

* * * * *